(12) United States Patent
Uchihashi et al.

(10) Patent No.: US 7,358,985 B2
(45) Date of Patent: Apr. 15, 2008

(54) SYSTEMS AND METHODS FOR COMPUTER-ASSISTED MEETING CAPTURE

(75) Inventors: Shingo Uchihashi, Kanagawa (JP); John Boreczky, San Leandro, CA (US); Jonathan Foote, San Mateo, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1116 days.

(21) Appl. No.: 09/981,735

(22) Filed: Oct. 19, 2001

(65) Prior Publication Data
US 2004/0201710 A1 Oct. 14, 2004

Related U.S. Application Data

(60) Provisional application No. 60/268,908, filed on Feb. 16, 2001.

(51) Int. Cl.
*H04N 7/14* (2006.01)
(52) U.S. Cl. .................... 348/14.08; 348/14.05; 348/14.03
(58) Field of Classification Search .. 348/14.01–14.09, 348/14.1, 14.11, 14.12, 14.13, 211.11, 212, 348/221, 143, 155
See application file for complete search history.

(56) References Cited

U.S. PATENT DOCUMENTS

| | | | | |
|---|---|---|---|---|
| 5,825,413 A * | 10/1998 | Mullis | .......................... | 348/155 |
| 5,959,667 A * | 9/1999 | Maeng | .................. | 348/211.99 |
| 6,452,628 B2 | 9/2002 | Kato et al. | .................. | 348/211 |
| 6,768,563 B1 * | 7/2004 | Murata et al. | .............. | 358/450 |
| 6,850,265 B1 * | 2/2005 | Strubbe et al. | .......... | 348/14.05 |
| 2002/0130955 A1 * | 9/2002 | Pelletier | ...................... | 348/211 |

FOREIGN PATENT DOCUMENTS

| JP | 404097685 A | * | 3/1992 |
|---|---|---|---|
| JP | 404301976 A | * | 10/1992 |
| JP | 08-181958 | * | 12/1996 |
| JP | 363142779 A | * | 6/1998 |
| JP | 410282564 A | * | 10/1998 |

OTHER PUBLICATIONS

Ojala; Video Conference equipment; May 7, 1998; WO98/19458.*
Bernier, o., Collobert, M., Feraud, R., Lemaire, V., Viallet, J.E. and Collobert, D., "MULTRAK: A System for Automatic Multiperson Localization and Tracking in Real-Time, " in Proc. ICIP'98, pp. 136-139, 1998.
Bianchi, M., "Auto Auditorium: A Fully Automatic, Multi-Camera System to Televise Auditorium Presentations" in Joint. DARPA/NIST Smart Spaces Technology Workshop, Gaithersburg, MD, Jul. 1998.
Chiu, P., Kapuskar, A., Reitmeier, S. and Wilcox, L, "NoteLook: Taking Notes in Meetings with Digital Video and Ink," in Proc. ACM Multimedia '99, pp. 149-158, 1999.
Cruz, G. and Hill, R., "Capturing and Playing Multimedia Events with STREAMS," in Proc. ACM Multimedia '94, pp. 193-200, 1994.
Mukhopadhyay, S. et al., Passive Capture and Structuring of Lectures in Proc. ACM Multimedia 1989, 1999, pp. 477-487.

* cited by examiner

*Primary Examiner*—Melur Ramakrishnaiah
(74) *Attorney, Agent, or Firm*—Sughrue Mion PLLC

(57) ABSTRACT

A computer assisted meeting capture system in which camera selection, camera control and sensor notification of candidate activity event for camera image changes are integrated. The information is displayed on a representation of a room layout. Camera switch suggestions are notified to the operator through the use of low-overhead cognitive cues such as changeable human sensible display characteristics.

20 Claims, 6 Drawing Sheets

| MEETING TYPE | OBJECT | ACTION |
|---|---|---|
| TOWN MEETING | CAMERA | AUTOTRACKING |
| TOWN MEETING | CAMERA HOLD MAX | 30 |
| TOWN MEETING | CAMERA HOLD MIN | 20 |
| TELECONFERENCE | CAMERA HOLD MAX | 45 |
| TELECONFERENCE | CAMERA HOLD MAX | 5 |

FIG. 6

```
if(target1.location) == near(front_of_table) then target1.height=SITTING;
if(target1.location) == far(front_of_table) then target1.height=STANDING;
if(target1.location) == near(front_of_podium) then (active_camera = camera3, target1.height=15);
ifif(target1.location) == near(back_of_table) then target1.height=STANDING;
```

FIG. 7 ystems and Methods for Computer-Assisted Meeting Capture

BACKGROUND OF THE INVENTION

1. Field of Invention

This invention relates to computer assisted and computer mediated recording or capture of meeting or presentation events.

2. Description of Related Art

Conventional video conference systems utilize a single camera with a single fixed focus to capture a meeting or presentation. This has the advantage that it keeps costs for camera and equipment low but has the disadvantage that the static presentations are perceived as boring. The captured presentation does not follow the flow of speaker or presentation activity within the conference or meeting.

Vendors of conference systems have attempted to address these problems by adding multiple cameras to their systems. While multiple camera systems allow multiple views, a great deal of attention must be focused on operating the system. Multiple video camera conferencing systems require a dedicated operator to perform tasks such as selecting a video feed from the multiple cameras, selecting a camera to zoom, deciding when to switch cameras to focus on another activity in the room and deciding exactly which activity to switch to.

Therefore, conventional multi-camera systems require a trained operator to perform these functions. This imposes additional resource constraints on scheduling and conducting captured meetings and presentations. For example, when the operator is unavailable due to a scheduling conflict or illness, the meeting must be rescheduled. Similarly, if there is a desire to maintain secrecy of the subject mater of the meeting or presentation, the meeting must be scheduled around the availability of an operator with the appropriate clearance, if one even exists.

Bianchi and Mukhopadhyay have developed experimental conference systems, as described in: "AutoAuditorium: a Fully Automatic, Multi-Camera System to Televise Auditorium Presentation," by Bianchi, M., Joint DARPA/NIST Smart Spaces Technology Workshop, Gaithersburg, Md., July, 1998; and "Passive Capture and Structuring of Lectures," by Mukhopadhyay, S. et al. in Proc. ACM Multimedia '99, pp. 477-487, 1999. However, these systems only work under the limited conditions of a single speaker making a presentation.

SUMMARY OF THE INVENTION

Accordingly, systems and methods for computer-assisted meeting capture allowing untrained meeting participants to capture meetings and presentations with multiple active speakers would be useful.

The various systems and methods for computer-assisted meeting capture according to this invention facilitate the capture of a meeting by untrained participants through the use of intuitive interfaces and embedded system intelligence.

BRIEF DESCRIPTION OF THE DRAWINGS

FIG. 6 shows an exemplary embodiment of a data structure usable to store setting information according to this invention;

FIG. 7 shows an exemplary embodiment of a data structure usable to store rule information according to this invention.

DETAILED DESCRIPTION OF PREFERRED EMBODIMENTS

Figure 1:
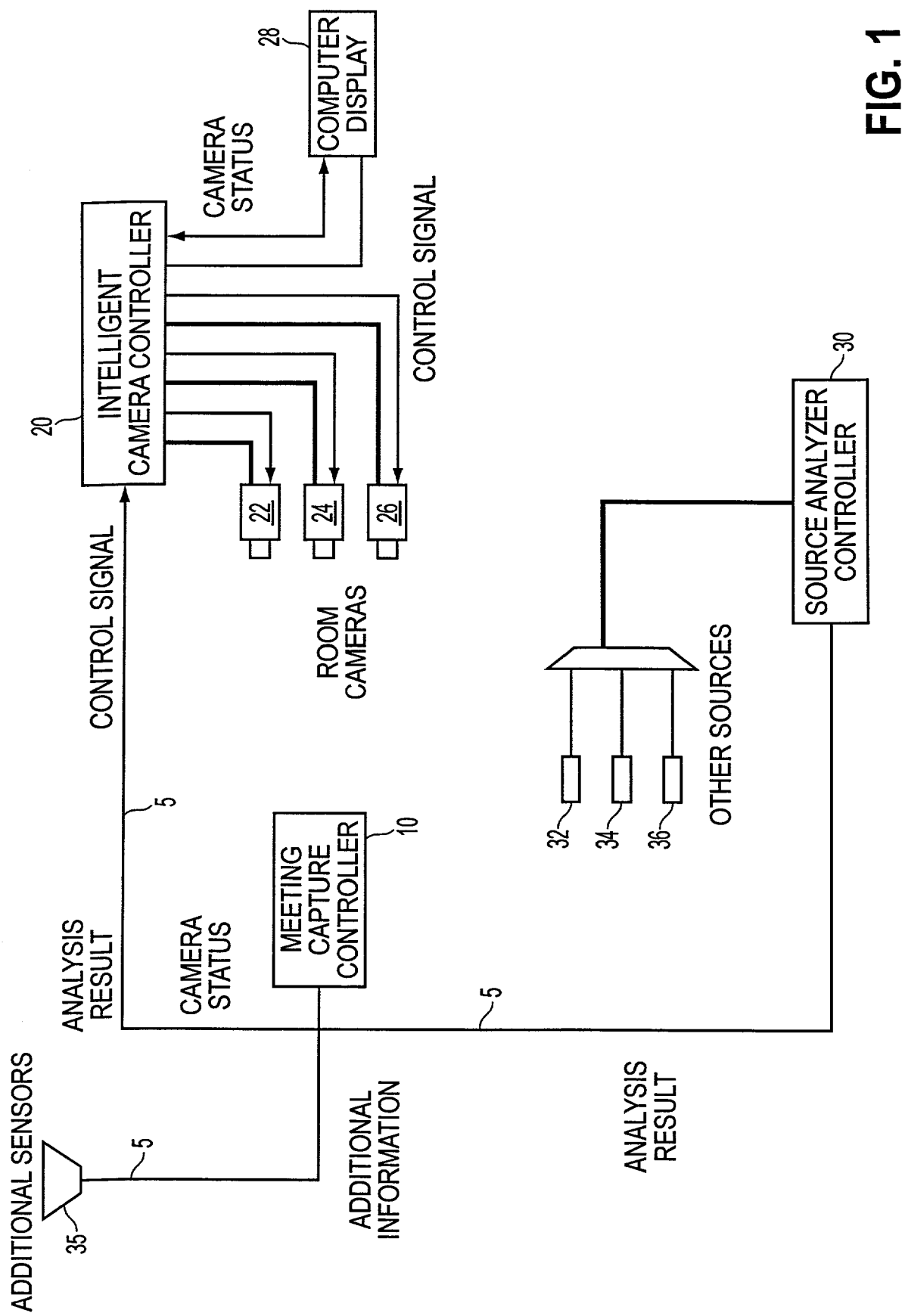
FIG. 1 shows an exemplary embodiment of a system for computer-assisted meeting capture system according to this invention.

FIG. 1 shows an exemplary embodiment of a computer-assisted meeting capture system according to this invention. As shown in FIG. 1, the computer-assisted meeting capture system 1 includes a meeting capture controller 10 and an intelligent camera controller 20 connected to a communication link 5. The intelligent camera controller 20 controls various aspects of one or more room cameras 22, 24 and 26 and a computer display 28. The computer-assisted meeting capture system 1 also includes a source analyzer controller 30 connected to one or more sensors 32, 34 and 36. The meeting capture controller 10, intelligent meeting capture controller 20, source analyzer controller 30 and additional sensors 35 are each connected to the communication link 5.

The communication link 5 may be any known or later developed device or system for connecting the meeting capture controller 10, the intelligent camera controller 20, the source analyzer 30 and the additional sensors 35, including a direct cable connection, a connection over a wide area network or a local area network, a connection over an intranet, a connection over the Internet, or a connection over any other distributed processing network or system. In general, the link 5 can be any known or later developed connection system or structure useable to connect the meeting capture controller 10, the intelligent camera controller 20 and the source analyzer 30.

Figure 2:
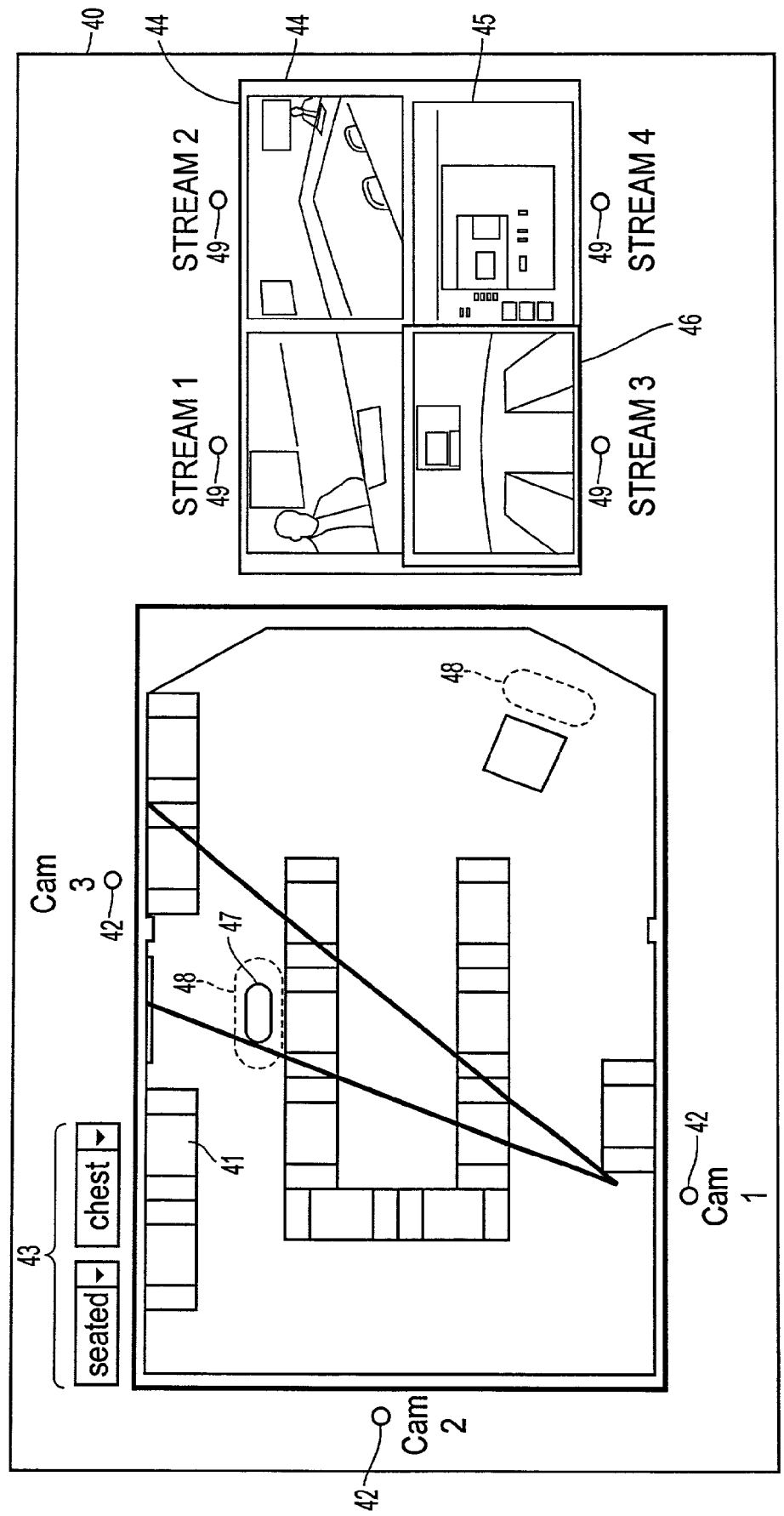
FIG. 2 shows an exemplary embodiment of a meeting capture controller user interface according to this invention.

The meeting capture controller 10 provides intuitive camera control and video stream switching using a computer-assisted meeting capture system, as shown in FIG. 2. As shown in FIG. 2, the graphical meeting capture controller user interface 40 displays images from the one or more room cameras 22-26 and other image sources. The other image sources may include, but are not limited to, a computer display 28, a video tape recorder/player, a satellite feed or any known or later developed type of image source. The graphical meeting capture controller user interface 40 also displays the status of the one or more cameras 22-26, any events occurring in the conference room and displays the various notifications received from the source analyzer 30, the additional sensors 35 and any system notifications.

The intelligent camera controller 20 interprets the high level commands from the computer-assisted meeting capture system and controls the cameras. The intelligent camera controller 20 receives high level commands from the meeting capture controller 10 for autonomous control of the cameras. For example, the meeting capture controller 10 may send a high level command to the intelligent camera controller 20 requesting that the intelligent camera controller 20 track a selected object or person. The intelligent camera controller 20 then provides the low-level camera coordination commands necessary to maintain the selected person or object in focus and properly framed and/or centered. Such commands may include pan and tilt adjustment of a camera to track the object and zoom control to maintain the proper aspect ratio of the person or object. The initial selection of the person or object may occur through the graphical meeting capture controller user interface 40.

The source analyzer controller 30 receives and analyzes information from the one or more intelligent room sensors 32, 34 and 36 distributed through the layout of the conference room. The intelligent room sensors 32-36 are connected over the communication link 5 to the source analyzer controller 30. The intelligent room sensors 32-36 may process the raw sensor information to reduce down stream processing required and reduce demand on the communication link 5. In various alternative embodiments of this invention, the sensor may be transferred to a central location for processing.

The source analyzer controller 30 integrates the information from the one or more intelligent sensors 32-36 to obtain candidate activity event information. Information from the intelligent sensors may be used determine the location of candidate event activity, such as the sound of the second speaker's voice. The candidate event activity is then provided to the operator in an intuitive format facilitating the selection of the appropriate camera capable of capturing the second speaker. In various embodiments of the computer-assisted meeting capture system 1, intelligent sensors, such as intelligent microphones, may be used to stereoscopically locate a candidate activity event. Similarly, an intelligent image sensor may determine physical motion by comparing two successive image frames.

The source analyzer 30 integrates the information from the sensors 32-36 and provides a display of the candidate sound event or physical motion event to the operator viewing the computer-assisted meeting capture 40 of the meeting capture controller 10. In one exemplary embodiment, intelligent microphones sensors and intelligent image capture sensors are used. However, it will be apparent that any type of intelligent sensor may be used in the systems according this invention. For example, seat occupancy sensors, floor pressure sensors, ultrasonic range finders or any other known or later developed sensor usable to sense candidate activity event information may be used without departing from the spirit or scope of this invention.

As indicated above, FIG. 2 shows an exemplary embodiment of the graphical meeting capture controller user interface 40 according to this invention. The graphical meeting capture controller user interface 40 displays the image data from three cameras and one computer display 45. The graphical meeting capture controller user interface 40 includes a room layout portion 41, one or more camera selection buttons 42, height and zoom information entry fields 43, and a monitor portion 44 usable to display image data. The active image data display 46 that is associated with the camera information currently being recorded is provided with a human sensible indicator. The human-sensible indicator conveys information to the operator which may indicate when a different camera or a different camera angle should be selected.

In various exemplary embodiments of the systems and methods of this invention, the human sensible indicator is provided by a colored border 46 surrounding the selected display. The meeting capture control system prompts the user based on the selected type of meeting. For example, a setting for a "lecture meeting" might indicate a maximum hold time for a type of camera image such as a head-shot. Overall system defaults such as a minimum camera image hold time can also be indicated. Different setting may apply for a "town meeting" type of meeting. A "town meeting" type of meeting may contain similar minimum camera hold time parameters but a longer maximum hold time parameter to allow the camera operator to hold the camera on a speaker for a longer period before alternate camera image data displays are suggested.

For example, in various exemplary embodiments, the meeting capture controller 10 encodes a setting stored in a memory with information for a certain type of meeting event. For example, a setting may indicate that the active image data should be held for no longer than 30 seconds. Then an indication is made to the operator that a camera change should occur. This setting may be loaded when the operator initially start the program by selecting from options such as 1) teleconference, 2) lecture, 3) court room or any other type of meeting.

The appropriate time to change cameras or change focus points is intuitively provided to the operator for example, by gradually changing the border color surrounding the display from a light gray color to a red color as the maximum camera hold time is reached. Alternatively, operators with camera experience may prefer that the information be displayed in the form of a timer showing elapsed time and a count down timer showing time remaining to an image data display switch. It should be understood that any human-sensible characteristic useful in conveying information, including but not limited to, the minimum and maximum suggested image hold times may be used in the systems and methods according to this invention.

The room layout portion 41 of the meeting capture controller user interface 40 is used to convey location information to the user intuitively and with low cognitive overhead. This facilitates entering position information into the system. The room layout portion 41 displays a representation of the room. The activity event information received by the source analyzer controller 30 from the intelligent sensors 32-36 is used to locate candidate activity events within the room layout portion 41 that may be captured either with a new camera selection or with a pan, tilt and or zoom change of a current camera selection.

For example, areas of the room layout portion 41 may be colored with one color 48 to indicate detected sound activity. Other areas of the room layout portion 41 may be colored with a second color to indicate detected physical movement (not shown). The source analyzer controller 30 may then select candidate activity events to be displayed to the operator. The candidate activity events are then displayed on the room layout portion 41 to facilitate the operator's next camera selection or a change in the focus, pan or tilt of the currently selected camera.

The operator may directly select a camera using the one or more buttons 42 located around the room layout portion 41, depending on where the candidate activity event of interest is located. The camera associated with a button 42 may also have a representation on the room layout portion 41 that indicates a camera field of view.

The operator may select the candidate activity event by clicking on a particular event using a mouse or other input device, or by touching a touch sensitive display. In various exemplary embodiments of the systems and methods according to this invention, the room layout portion 41 indicates two dimensions of the room. The meeting capture controller 10 stores location information and type information about identified objects within the conference room. The identified object location and object type information may be used to determine the appropriate pan, tilt and/or zoom parameters and/or the appropriate camera to select to capture the candidate activity event based on identified relations or rules. For example, the location, orientation and height information about a table and chair in a meeting room are stored in the meeting capture controller 10. Sensor information might indicate that a candidate activity event occurs near the front of the table, and near the chair. A seat sensor might indicate that the chair is occupied. The meeting capture controller applies rules based on the sensor information to infer that a seated head shot would be the appropriate height and zoom parameters to capture the candidate activity event. It will be apparent that the rule information can also be used to infer appropriate camera selection, appropriate microphone selection and appropriate room lighting or any other parameter useful in facilitating the capture of the meeting. Any technique of providing additional information such as text entry may used.

An operator may decide to over-ride the suggested height and zoom information and select alternate height and/or zoom parameters using the height and zoom information entry fields 43. The height and zoom entry fields 43 are associated with default parameters for the room layout that may be used to override the settings determined by the meeting capture controller 10. These fields may be accessed via pull-down menus or any other known or later developed method of input entry to provide height information to the room layout representation. Operators can select one of the predefined menu items in the menu like "standing" or "seated" and a zoom parameter. The zoom parameter is specified by terms that are widely used among people in broadcast business and also easy to understand by others. Example of such terms are "head", "shoulder", or "chest", each term means capturing a shot of the person's head, the person's head and shoulder, and the person's head, shoulder and chest respectively. An advantage of using the terms is that operators can relatively easily specify the zoom parameter without worrying about adjusting it. Other information may be sent to the meeting capture controller 10 such as "track a person".

The selected activity information is then passed by the meeting capture controller 10 to the intelligent camera controller 20 in order to calculate the quantity of tilt and zoom required for the selected camera 22. When the operator indicates an area of interest by a control indication or gesture on a region of the room layout portion 41 to indicate a selection, circling an activity area 47 with a mouse or stylus gesture or any other method of indicating the area of interest on the room layout portion 41, the activity location in the x-y coordinate plane is captured and combined with the z coordinate information suggested based on the stored rules. If the operator has entered parameters into the height and zoom information entry fields 43, these parameters are used instead of the rule determined parameters. This combined information is then transferred to the intelligent camera controller 20. The combined x, y and z coordinate information is used to drive the selected camera to cover the selected activity event. In various alternative embodiments not shown, the candidate activity information may also be used to select a camera based on the knowledge of the room layout maintained by the intelligent camera controller 20 thereby further reducing the burden on the operator.

The operator may select activity events by indicating an activity event of interest on the room layout portion 41 with a control indication or gesture such as circling a location 47. The size and the location of the control indications or gestures are sent to the intelligent camera controller 20. The size and location information and the types of gesture are interpreted by the intelligent camera controller 20. The intelligent camera controller 20 generates low level commands to drive the selected camera and to shoot the area specified by the control indications or gestures. Camera control, and camera control gestures are also discussed in co-pending application Ser. No. 09/391,141, filed, Sep. 7, 1999 incorporated herein by reference in its entirety.

Using the monitor portion 44, the operator may select a different camera for the monitor view using the buttons 49 adjacent to each monitor view. The monitor portion 44 may also be used to provide incremental control over a selected camera. For example, a control indication or gesture such as tapping on the lower right corner of a selected monitor view 46 of the monitor portion 44 may be used to move the camera incrementally in the direction of the control indication or gesture. Drawing a straight line on the selected monitor view 46 will move the camera in the direction of the control indication or gesture based on the length of the line drawn.

The room layout portion 41 and the video monitor portion 44 of the meeting capture controller user interface 40 provides an intuitive way to directly specify a location to aim the camera and provides a way to send incremental instructions to the cameras with low cognitive overhead in an integrated system providing for complete camera control.

Figure 3:
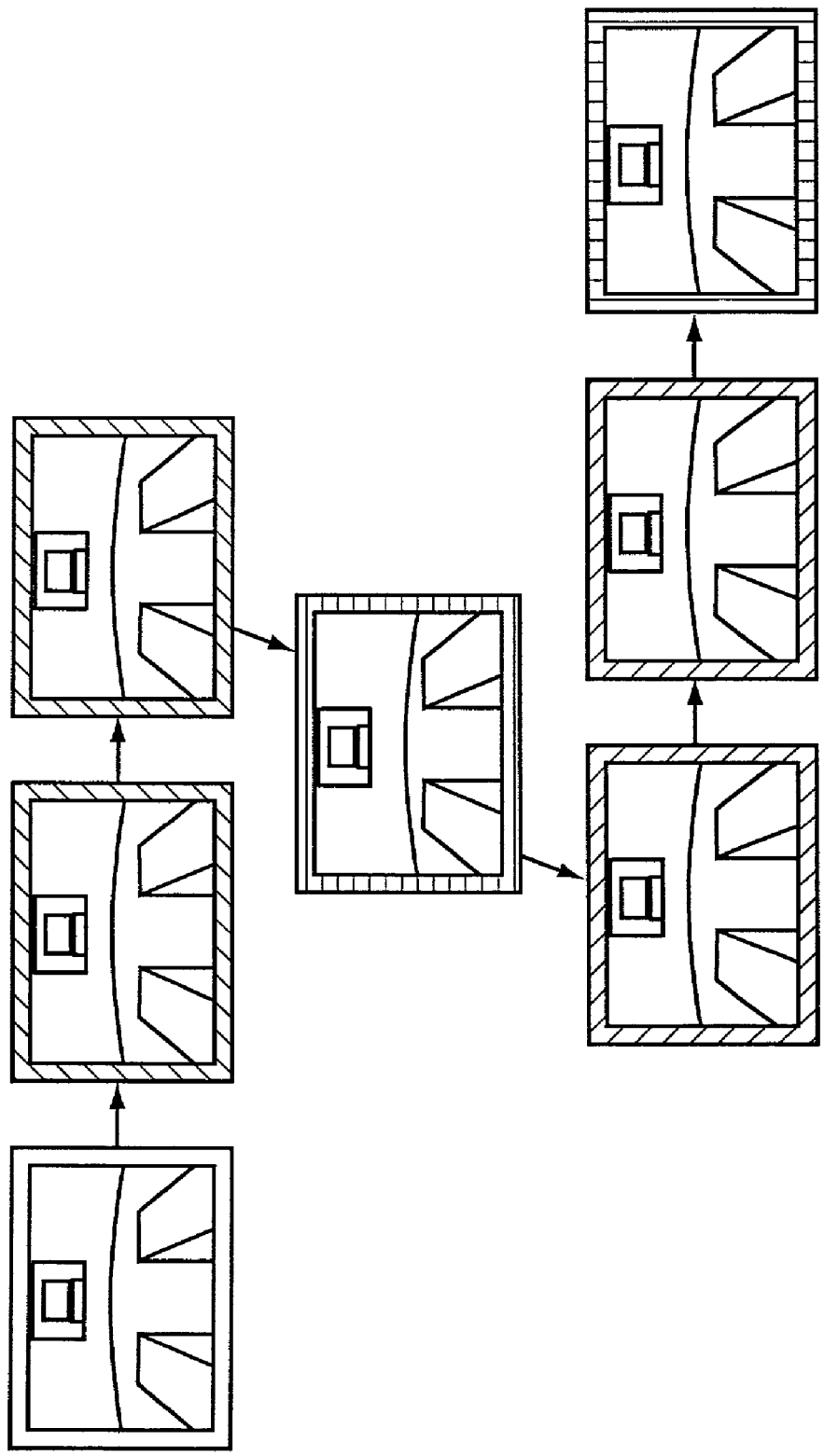
FIG. 3 shows an exemplary embodiment of a frame color transition of a stream monitor according to this invention.

FIG. 3 shows a human sensible element that is dynamically adjusted to indicate how long the image has been displayed. The window border changes hue color from a light hue for a low hold time to a red color as the maximum hold time is reached and then exceeded.

Figure 4:
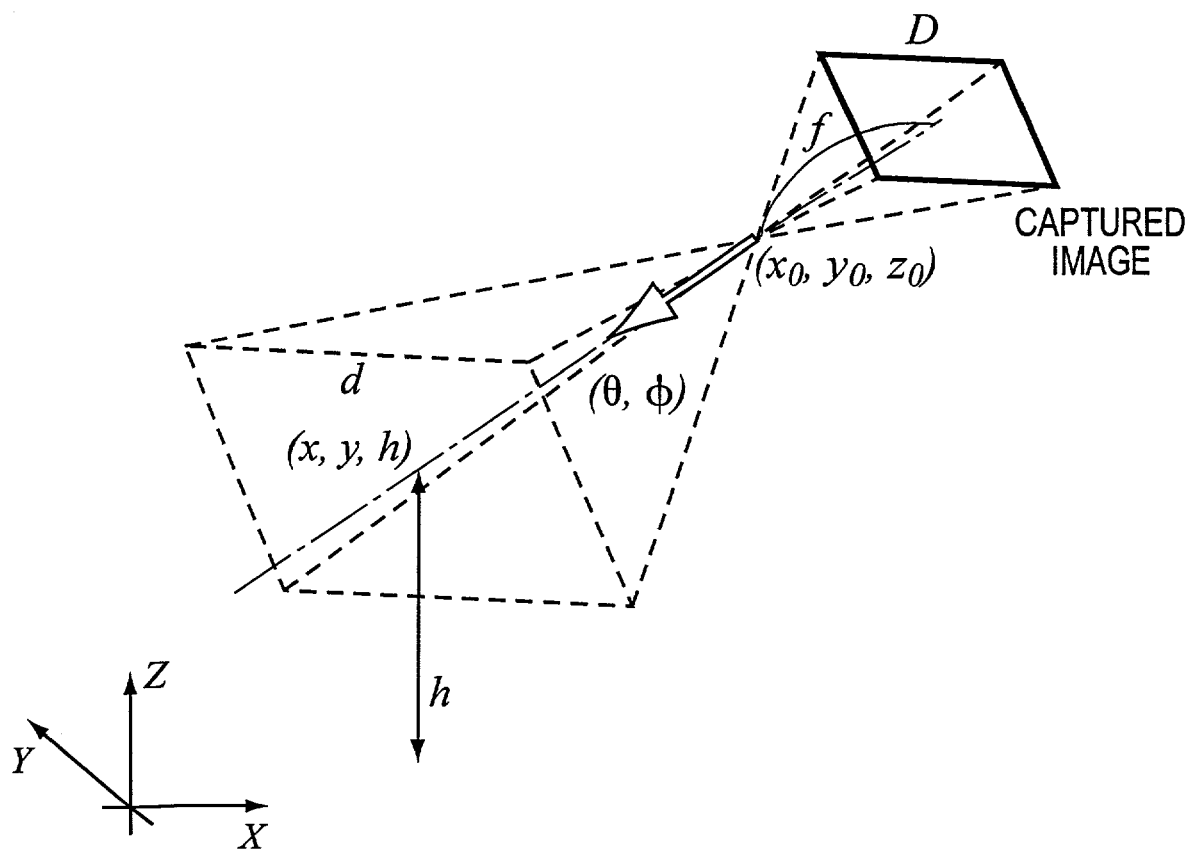
FIG. 4 shows an exemplary embodiment of a camera coordination according to this invention.

FIG. 4 shows an exemplary camera coordinate transformation system. As discussed above, the intelligent camera controller 20 interprets high-level commands from the meeting capture controller 10 and generates low-level commands to drive the cameras. The intelligent camera controller 20 holds geometric information about the conference or meeting room layout room as well as parameters to drive the room cameras. For a pan/tilt capable camera, the center of rotation ($x_o$, $y_o$, $z_o$) can be defined geometrically. If the parameters to direct the camera to a desired angle are known, the camera can be driven in any direction ($\theta, \phi$) to aim at any point in a room within its range of motion, where $\theta$ is an angle around the z-axis, and $\phi$ is an angle from the x-y plane. A zoom-capable camera also takes a parameter to control a focal length f. By providing an appropriate parameter, the camera can capture pictures of any view angle. Therefore, a pan/tilt/zoom capable camera typically takes three variables $v_p$, $v_t$, and $v_2$. Each variable specifies an amount of panning, tilting and zooming respectively. The correspondence between these variables and the actual camera parameters can be described by the following three equations (1-3). If the correspondence is linear, equations (1-3) can be rewritten as equation (4), where $\alpha_p$, $\alpha_t$, $\alpha_f$, $\beta_p$, $\beta_t$ and $\beta_f$, are camera-dependent constants.

$$\theta = \Psi_p(v_p) \tag{1}$$

$$\phi = \Psi_t(v_t) \tag{2}$$

$$f = \Psi_f(v_f) \tag{3}$$

$$\begin{pmatrix} \theta \\ \phi \\ f \end{pmatrix} = \begin{pmatrix} \alpha_p 0 0 \\ 0 \alpha_t 0 \\ 0 0 \alpha_f \end{pmatrix} \begin{pmatrix} v_p \\ v_t \\ v_f \end{pmatrix} + \begin{pmatrix} \beta_p \\ \beta_t \\ \beta_f \end{pmatrix} \tag{4}$$

A command from the meeting capture controller 10 room layout portion 41 includes x-y location, height, and view angle information. If the command is generated by a control indication or gesture, as discussed above, the view angle information is given in the abstract form, such as "head" or "chest". The meeting capture controller 10 combines the information and transfers the information over commnunication link 5 to the intelligent camera controller. The intelligent camera controller 20 uses an appropriate pre-defined value d to replace the abstract information. For a command by a circle gesture, the size of the circle drawn on the room layout portion 41 of the meeting capture controller user interface 40 is used for d. Control indications and gestures on the room layout portion 41 or the monitor view 44 transfer one of the preset abstract height values to the intelligent camera controller 20. This pre-set height value is also replaced by an appropriate pre-defined value h by the intelligent camera controller 20. If the operator does not enter the height and zoom information, the parameters determined through the application of the active rules are used to determine the height and zoom information.

After replacing all the abstract values with real values, the intelligent camera controller 20 has a location (x, y, z) at which to aim and an area to be covered (d). Based on the real values and the camera parameters, the intelligent camera controller 20 determines the variables $v_p$, $v_t$, and $v_z$, that are required to drive the selected camera to capture images of the selected activity event.

In a first step, the θ, φ, and f are determined from the points ($x_o$, $y_o$, $z_o$) and (x, y, h) based on equations (5)(6)(7). In a second step the inverses of equation (1)(2)(3) are used to obtain $v_p$, $v_t$, and $v_z$.

$$\theta = a\tan\frac{y - y_0}{x - x_0} \quad (5)$$

$$\phi = a\sin\frac{h - z_0}{\sqrt{(x - x_0)^2 + (y - y_0)^2}} \quad (6)$$

$$f = \frac{D\sqrt{(x - x_0)^2 + (y - y_0)^2 + (h - z_0)^2}}{d} \quad (7)$$

The preset values used to replace abstract values given by the meeting capture controller 10 are only good for a first estimation. The intelligent camera controller 20 autonomously adjusts the low level camera commands issued to meet the original high level command sent by the meeting capture controller 10. For example, the captured images can be processed to detect a person using various features, such as motion, edges, color or combinations of these parameters. If no person is detected, the intelligent camera controller 20 stops autonomously adjusting the camera position. The camera orientation is thereby adjusted to eliminate the gap between the actual location of the detected person and the ideal location of a person specified by the high level command.

Once the adjustment is done, the camera captures a person with a desired size. By continuously adjusting the direction of the camera to maintain the person in the captured images, the camera can autonomously track the person. This tracking feature can be turned on and off by commands from the meeting capture controller 10.

The one or more intelligent sensors 32, 34 and 36 may provide pre-processing of sensor signal information. The intelligent sensor output is analyzed by the source analyzer controller 30, as discussed above. Based on the integrated sensor information, the meeting capture controller 10 facilitates the operator's selection of cameras and the operator's switching of video image information based on the rule information and the setting information stored in the meeting capture controller 10. The setting information includes the time to hold a video image and when to suggest switching to another video image. The rule information contains rules for suggesting camera functions based on knowledge of the objects appearing in a room and based on the sensor information. The outputs from the one or more intelligent sensors 32-36 are visually present on the graphical meeting capture controller user interface 40, so that users can easily determine the appropriate cameras to use to capture the activity events.

A microphone array is one example of an intelligent sensor. Multiple microphones installed in a conference room can be used to locate a speaker. The graphical meeting capture controller user interface 40 shows identified activity event location information in the room view by putting a colored blob at the identified activity event. A user can tap on the blob or draw a circle around the blob to drive one of the room cameras to capture the speaker or activity event.

Physical motion activities in a room can also be visually captured using a wide-view-angle camera. The use of wide angle view cameras in meeting capture is further discussed in co-pending application Ser. No. 09/370,406 filed Aug. 9, 1999 incorporated herein by reference in its entirety. Room locations with the most intensive motion can be easily determined by taking a difference between every two frames of video from the camera. The detected motion location is then identified as an event candidate by displaying a colored area on the meeting capture controller 10 user interface 40. Different colors may be used to indicate different degrees of activities or different types of activities. For example, motion event activity may be displayed in one color and sound event activity may be displayed in a second color.

Figure 5:
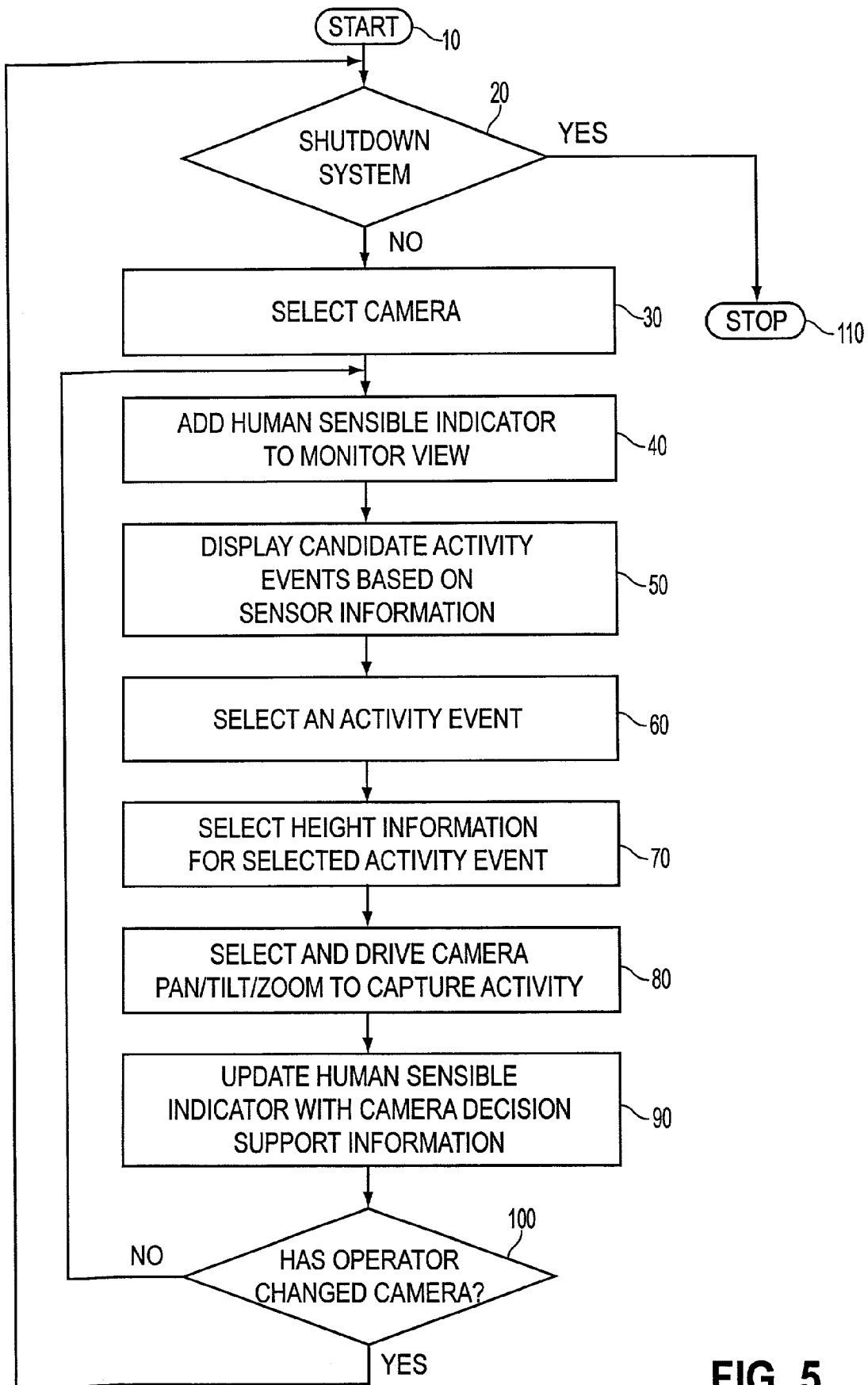
FIG. 5 shows a flowchart outlining an exemplary embodiment of a method of capturing a meeting according to this invention.

FIG. 5 shows a flowchart outlining an exemplary embodiment of a method automatically capturing a meeting according to this invention. Beginning in step S10, control continues to step S20 where a determination is made whether the operator has requested a shutdown of the system. The shutdown may be requested by selecting a menu, entering a control key combination or any other known or later developed technique of shutting down the system. If it is determined in step S20 that the operator has chosen to shut down the system, then control jumps to step S110 and the process ends.

If it is determined at step S20 that the operator has not chosen to shut down the system, then control continues to step S30 where a camera is selected. A camera may be selected for example by selecting an area adjacent the cameras location on a representation of the meeting room. The camera may also be selected by selecting an area adjacent an actual monitor display. Control then continues to step S40.

In step S40 a human sensible indicator is added to a monitor view of the selected camera. A human sensible indicator may include a window border around the monitor that changes color based on the previously stored information concerning camera hold times. Alternatively camera hold time may be indicated by a human sensible characteristic such as a slowly increasing sound or steadily increasing flashing of the border. Control then continues to step S50.

Next in step S50, the candidate activity events are displayed. The candidate activity events are events of potential interest in the meeting. For example, during a teleconference, a speaker may be making an assertion in a discussion. Image activity such as someone pointing to a chart on the wall might indicate an unspoken response to the assertion. This image activity is detected by sensors which indicate the candidate activity event on the user interface. Candidate activity events are determined based on processing of the intelligent sensor information. Other candidate activity events may include, but are not limited to, sounds located through intelligent stereoscopic microphone sensors and physical motion detected by interframe image analysis to detect motion. Activity events are displayed on an intuitive user interface incorporating representations of the meeting layout. The display may utilize one color to reflect one type of activity, such as motion. An icon may be used to represent a second type of activity, such as sound. The user interface may include a touch sensitive screen for operator entry of information. Control then continues to step S60.

In step S60, an activity event is selected. The operator may select a displayed activity event by touching the displayed activity event on a touch-sensitive screen or selecting it with a mouse or other user input device. In various alternative embodiments of this invention, the activity event may be selected under program control. Then, in step S70, the height and zoom information is specified for the activity event selected in step S60. Through the use of object location and object type information and rules relating the sensed activity events to the objects, height and zoom information may be determined. For example, candidate activity events atop a table are unlikely to require a floor or standing shot since the height is known to be at least that of the table top surface. The operator may override the suggested height and zoom information to indicate the camera should cover the activity event using the operator specified override parameters such as head-shot or face-shot. In various alternative embodiments of this invention, the height and zoom information may be provided dynamically through constant monitoring of the intelligent sensors.

Next, in steps S80, the height and zoom information is combined. The appropriate values necessary to drive the selected camera pan/tilt and/or zoom operations are determined and the camera actuated to capture the desired activity event. Control then continues to step S90.

In step S90, the human sensible indicator is updated since the camera, camera angle and/or zoom angle have changed. As the image is displayed, the human sensible indicator changes to unobtrusively provide meeting control information such as a minimum hold time for a camera and when a further image change may be desirable. Control then continues to step S100.

In step S100 a determination is made whether the operator has changed the camera. If the operator has changed the camera, control jumps back to step S40 and the process repeats. If the operator has not changed the camera, control jumps back to step S20 and the process continues until the operator indicates in step S20 that the system should be shut down. If the operator indicates that the system should be shut down, control jumps to step S110 and the process ends.

FIG. 6 shows an exemplary setting data structure 50. The setting data structure 50 provides a convenient storage facility for storing minimum and maximum camera hold times, autotracking settings and system setting information. Since the operator may indicate all the settings when the system is first started, the exemplary setting data structure 50 allows the operator to select appropriate hold times and tracking settings based on the type of meeting selected. A setting data structure portion 60 specifies the meeting type. The meeting type may be "Town Meeting" or may be "Teleconference Meeting" or any name defining a meeting type. A setting data structure portion 70 specifies an object type. The object type identifies what object will be set and may include but is not limited to camera minimum and maximum hold times, autotracking and microphones settings. Any controllable object may be specified. A setting data structure portion 80 identifies the action to be performed when the object indicated by the setting data structure portion 70 is initialized. The actions may include but are not limited to setting autotracking of cameras and the specification of minimum and maximum hold times for a camera.

FIG. 7 shows an exemplary rule data structure 90 for storing rule information. In the exemplary embodiment, rules are encoded that relate the object location and object type information of the conference room with sensor information. For example, the first entry in the rule data structure 90 indicates that if the location of the activity event target 1 is near the area or zone named "front_of_table" then the target 1 height setting should be set to SITTING. The location of target 1 may be determined through any means including but not limited to sensor information, direct text input and mouse selection. As a result of the rules activation, the operator will receive the suggestion for the proper height parameter to use to capture the event.

Similarly, the second entry shows that when target 1 is located far from the zone of "front_of_table" the target height information is set to STANDING to correctly capture the event.

The third entry shows the selection of height information using a numeric value of 15 and specifying the use of camera 3. Camera 3 is selected since the target is in near the zone named "front_of_podium".

The fourth entry specifies that if target 1 is located far from the zone defined as "back_of_table" then the target information is set to STANDING since the target 1 is unlikely to be sitting so far away from the front of the table zone.

In the various exemplary embodiments outlined above, the computer assisted meeting capture system 1 can be implemented using a programmed general purpose computer. However, the computer assisted meeting capture system 1 can also be implemented using a special purpose computer, a programmed microprocessor or micro-controller and peripheral integrated circuit elements, an ASIC or other integrated circuit, a digital signal processor, a hard-wired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 5, can be used to implement the computer assisted meeting capture system 1.

Each of the circuits, software routines or elements of the various exemplary embodiments of the computer assisted meeting capture system 1 outlined above can be implemented as portions of a suitably programmed general purpose computer. Alternatively, each of the circuits, software routines or elements of the various exemplary embodiments of the computer assisted meeting capture system 1 outlined above can be implemented as physically distinct hardware circuits within an ASIC, or using a FPGA, a PDL, a PLA or a PAL, or using discrete logic elements or discrete circuit elements. The particular form each of the circuits, software routines or elements of the various exemplary embodiments of the computer assisted meeting capture system 1 outlined above will take is a design choice and will be obvious and predicable to those skilled in the art.

Moreover, the various exemplary embodiments of the computer assisted meeting capture system 1 and/or each of the various circuits or software routines or elements discussed above can each be implemented as software routines, managers or objects executing on a programmed general purpose computer, a special purpose computer, a microprocessor or the like. In this case, the various exemplary embodiments of the computer assisted meeting capture system 1 and/or each of the various circuits or software routine or elements discussed above can each be implemented as one or more routines embedded in the communications network, as a resource residing on a server, or the like. The various exemplary embodiments of the computer assisted meeting capture system 1 and the various circuits or software routine or elements discussed above can also be implemented by physically incorporating the computer assisted meeting capture system 1 into a software and/or hardware system, such as the hardware and software systems of a web server or a client device.

As shown in FIG. 1, the memory can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 5 shown in FIG. 1 can be any known or later-developed device or system for connecting a communication device to the computer assisted meeting capture system 1, including a direct cable connection, a connection over a wide area network or a local area network, a connection over an intranet, a connection over the Internet, or a connection over any other distributed processing network or system. In general, the communication links 5 can be any known or later-developed connection system or structure usable to connect devices and facilitate communication.

Further, it should be appreciated that the communication links 5 can be a wired or wireless links to a network. The network can be a local area network, a wide area network, an intranet, the Internet, or any know or later-developed other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer assisted meeting capture system comprising:
    a meeting capture controller;
    at least one of a camera having a plurality of angles and a plurality of cameras;
    a sensor, different from the at least one camera, to determine sensed activity information;
    a storage device that stores object position information and rule information;
    wherein the meeting capture controller displays, for selection by an operator, at least one of a suggested camera selection and a suggested camera angle selection based on the sensed activity information, the stored object position information and the stored rule information, and wherein displaying comprises providing at least a portion of the sensed activity information to the operator to facilitate the selection of the camera selection and the camera angle selection by the operator.

2. The system of claim 1 wherein the meeting capture controller automatically selects at least one of the suggested camera and the suggested camera angle for recording the sensed activity information.

3. The system of claim 1 wherein the sensed activity information comprises at least one of sound information, movement information and presence information.

4. The system of claim 3 wherein the movement information is obtained from at least one of passive infra-red detectors, microwave detectors, photo-detectors and ultra-sound detectors.

5. The system of claim 3 wherein the presence information is obtained from at least one of passive infra-red detectors, microwave detectors, photo-detectors, pressure detectors and ultra-sound detectors.

6. The system of claim 1 wherein the sound information is obtained from microphones.

7. The system of claim 1 wherein the stored object location information is obtained automatically by at least one of a geo-positioning system signal and a mobile locator service signal.

8. The system of claim 1, further comprising an input device, wherein the at least one of the suggested camera selection and the suggested camera angle selection is manually selected by a user using the input device.

9. A method of computer assisted meeting capture comprising:
    providing at least one of a camera having a plurality of angles and a plurality of cameras;
    determining activity information from a sensor, different from the at least one camera; and
    displaying, for selection by an operator, at least one of a suggested camera selection and a suggested camera angle selection based on determined sensed activity information, stored object position information and stored rule information, wherein displaying comprises providing at least a portion of the sensed activity information to the operator to facilitate the selection of the camera selection and the camera angle selection by the operator.

10. The method of claim 9 wherein the suggested camera and the suggested camera angle are selected for recording the sensed activity information.

11. The method of claim 9 wherein determining the activity information from a sensor comprises sensing at least one of sound information, movement information presence information.

12. The method of claim 9 wherein determining the activity information from a sensor comprises sensing the sound information from microphones.

13. The method of claim 9 wherein determining the activity information from a sensor comprises sensing movement information obtained from at least one of passive infra-red detectors, microwave detectors, photo-detectors and ultrasound detectors.

14. The method of claim 9 wherein determining the activity information from a sensor comprises sensing presence information obtained from at least one of passive infra-red detectors, microwave detectors, photo-detectors, pressure detectors and ultra-sound detectors.

15. The method of claim 9 wherein the stored object location information is obtained automatically determined by at least one of geo-positioning system signal and mobile locator service signal.

16. The method of claim 9, further comprising:
providing an input device; and
receiving a selection of at least one of the suggested camera selection and the suggested camera angle selection by a user via the input device.

17. A carrier wave encoded to transmit a control program usable for computer assisted meeting capture to a device for executing the control program, the control program including instructions comprising:
instructions for determining activity information from a sensor, different from a camera; and
instructions for displaying, for selection by an operator, at least one of a suggested camera selection and a suggested camera angle selection based on determined sensed activity information, stored object position information and stored rule information, wherein displaying comprises providing at least a portion of the sensed activity information to the operator to facilitate the selection of the camera selection and the camera angle selection by the operator.

18. A computer readable storage medium, comprising, computer readable program code embodied on the computer readable storage medium, the computer readable program code usable to program a computer to perform computer assisted meeting capture further comprising the steps of:
instructions for determining activity information from a sensor, different from a camera; and
instructions for displaying, for selection by an operator, at least one of a suggested camera selection and a suggested camera angle selection based on determined sensed activity information, stored object position information and stored rule information, wherein displaying comprises providing at least a portion of the sensed activity information to the operator to facilitate the selection of the camera selection and the camera angle selection by the operator.

19. A method of computer assisted meeting capture comprising:
providing at least one of a camera having a plurality of angles and a plurality of cameras;
determining activity information from a sensor, different from the at least one camera, and comprising sensing movement information obtained from at least one of passive infra-red detectors, microwave detectors, photo-detectors and ultrasound detectors; and
displaying, for selection by an operator, at least one of a suggested camera selection and a suggested camera angle selection based on determined sensed activity information, object position information and rule information stored in a storage device, wherein displaying comprises providing at least a portion of the sensed activity information to the operator to facilitate the selection of the camera selection and the camera angle selection by the operator.

20. A computer assisted meeting capture system comprising:
a meeting capture controller;
at least one of a camera having a plurality of angles and a plurality of cameras;
a sensor, different from the at least one camera, to determine sensed activity information;
a storage device that stores object position information and rule information;
wherein the meeting capture controller displays, for selection by an operator, at least one of a suggested camera selection and a suggested camera angle selection based on the sensed activity information, the stored object position information and the stored rule information, wherein the sensor information comprises at least one of sound information, movement information and presence information and wherein the stored object location information is obtained automatically by at least one of a geo-positioning system signal and a mobile locator service signal and wherein displaying comprises providing at least a portion of the sensed activity information to the operator to facilitate the selection of the camera selection and the camera angle selection by the operator.

* * * * *